United States Patent
Otto

(10) Patent No.: US 10,011,425 B2
(45) Date of Patent: Jul. 3, 2018

(54) CONVEYOR FOR CONVEYING SUSPENDED OBJECTS

(71) Applicant: Dematic GmbH, Heusenstamm (DE)

(72) Inventor: Thomas Otto, Bielefeld (DE)

(73) Assignee: Dematic GmbH, Heusenstamm (DE)

( * ) Notice: Subject to any disclaimer, the term of this patent is extended or adjusted under 35 U.S.C. 154(b) by 0 days.

(21) Appl. No.: 15/472,407

(22) Filed: Mar. 29, 2017

(65) Prior Publication Data

US 2017/0283173 A1 Oct. 5, 2017

(30) Foreign Application Priority Data

Mar. 29, 2016 (DE) .................. 10 2016 105 716

(51) Int. Cl.
*B65G 9/00* (2006.01)
*B65G 19/02* (2006.01)
*B65G 47/61* (2006.01)

(52) U.S. Cl.
CPC .............. *B65G 9/008* (2013.01); *B65G 9/006* (2013.01); *B65G 19/025* (2013.01); *B65G 47/61* (2013.01);
(Continued)

(58) Field of Classification Search
CPC ........ B65G 9/002; B65G 9/006; B65G 9/008; B65G 17/20; B65G 19/025; B65G 47/61; B65G 2812/186; B65G 2812/188
See application file for complete search history.

(56) References Cited

U.S. PATENT DOCUMENTS

| 3,196,804 | A | * | 7/1965 | Harrison | ............... B61B 10/025 104/172.4 |
| 3,343,498 | A | * | 9/1967 | Klamp | ................. B61B 10/025 104/88.05 |

(Continued)

FOREIGN PATENT DOCUMENTS

| DE | 29709547 U1 | 8/1997 |
| DE | 20103664 U1 | 6/2001 |

(Continued)

OTHER PUBLICATIONS

Commonly assigned co-pending U.S. Appl. No. 15/472,405, filed Mar. 29, 2017, entitled Conveyor for Conveying Suspended Objects.

*Primary Examiner* — Gene O Crawford
*Assistant Examiner* — Keith R Campbell
(74) *Attorney, Agent, or Firm* — Gardner, Linn, Burkhart & Ondersma, LLP

(57) ABSTRACT

A conveyor for suspended objects has a first rail profile having a first, upper track and a second track arranged below the first track, a conveyor chain having lateral friction roller pressing surfaces to drive the conveyor chain continuously in the first track. Holding adapters for conveyed objects are coupled to the conveyor chain, with the holding adapters being transferred into the first rail profile by an induct switch. A pressing piece arranged on a side of the conveyor chain opposite the drive roller is adjustable between an active and a passive position. The adjustment path of the pressing piece is dimensioned such that in the active position the conveyor chain is in contact with the drive roller and in the passive position the conveyor chain is not in contact with the drive roller, whereby in the active position the drive roller can be driven by the conveyor chain.

16 Claims, 4 Drawing Sheets

(52) U.S. Cl.
CPC .. *B65G 2812/186* (2013.01); *B65G 2812/188* (2013.01)

(56) References Cited

U.S. PATENT DOCUMENTS

| | | | | |
|---|---|---|---|---|
| 3,839,966 | A | * | 10/1974 | Tunison ................. A22B 7/004 104/100 |
| 5,048,426 | A | | 9/1991 | Burt et al. |
| 5,224,919 | A | | 7/1993 | Walsh |
| 5,768,998 | A | * | 6/1998 | Enderlein ............... B61B 10/02 104/103 |
| 6,234,290 | B1 | | 5/2001 | Drexl et al. |
| 6,298,969 | B1 | | 10/2001 | Otto |
| 6,540,057 | B2 | | 4/2003 | Konrad et al. |
| 6,540,058 | B2 | | 4/2003 | Drexl et al. |
| 6,588,558 | B2 | | 7/2003 | Otto et al. |
| 6,622,836 | B2 | | 9/2003 | Otto et al. |
| 6,688,445 | B2 | | 2/2004 | Otto |
| 6,698,575 | B2 | * | 3/2004 | Gartner ................ B65G 19/025 198/465.4 |
| 6,786,323 | B2 | * | 9/2004 | Schonenberger .... B65G 19/025 198/678.1 |
| 8,490,774 | B2 | | 7/2013 | Janzen |
| 8,561,787 | B2 | | 10/2013 | Wend et al. |
| 8,607,963 | B2 | | 12/2013 | Wend et al. |
| 8,672,118 | B2 | * | 3/2014 | Janzen ................... B65G 47/61 198/678.1 |
| 9,027,734 | B2 | | 5/2015 | Wend et al. |
| 9,056,722 | B2 | * | 6/2015 | Otto ..................... B61B 10/025 |
| 9,205,990 | B2 | | 12/2015 | Otto |
| 9,205,992 | B2 | * | 12/2015 | Otto ....................... B65G 17/20 |
| 9,296,561 | B2 | | 3/2016 | Wend et al. |
| 9,440,791 | B2 | * | 9/2016 | Wend ....................... B65G 9/00 |
| 9,475,656 | B2 | | 10/2016 | Sieksmeier et al. |
| 9,573,773 | B2 | | 2/2017 | Otto |
| 2015/0239671 | A1 | * | 8/2015 | Wend ................... B61B 10/025 198/347.1 |
| 2017/0283172 | A1 | * | 10/2017 | Otto ....................... B65G 9/008 |

FOREIGN PATENT DOCUMENTS

| | | |
|---|---|---|
| DE | 10012524 A1 | 9/2001 |
| DE | 102004018569 A1 | 11/2005 |
| DE | 102005006067 A1 | 8/2006 |
| DE | 102006007936 A1 | 8/2007 |
| DE | 102010053426 B3 | 6/2012 |
| EP | 0336714 A2 | 10/1989 |
| EP | 0416337 A1 | 3/1991 |
| EP | 1258439 A1 | 11/2002 |
| EP | 1420106 A1 | 5/2004 |
| EP | 1690811 A1 | 8/2006 |
| EP | 2196415 B1 | 1/2013 |
| EP | 2818434 A1 | 12/2014 |
| EP | 2886494 A1 | 6/2015 |
| EP | 2910499 A1 | 8/2015 |
| EP | 2789555 B1 | 6/2016 |
| GB | 2243816 A | 11/1991 |
| JP | S6077011 A | 5/1985 |
| JP | H08151111 A | 6/1996 |
| WO | 0147791 A2 | 7/2001 |

* cited by examiner

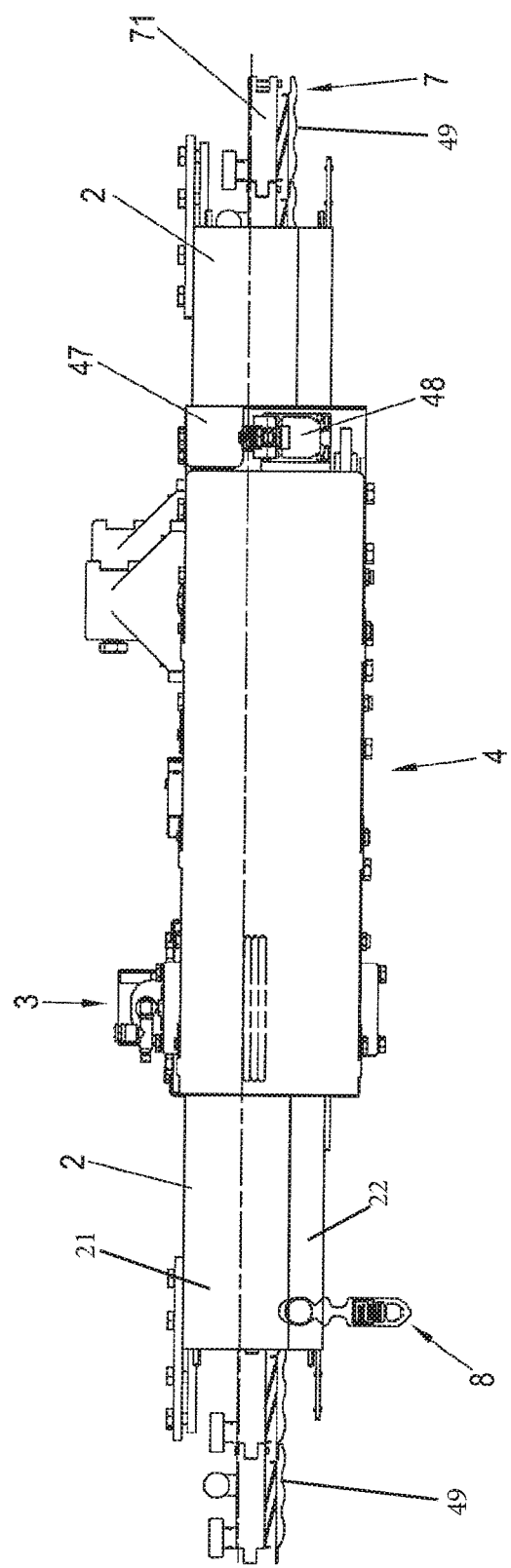

CONVEYOR FOR CONVEYING SUSPENDED OBJECTS

CROSS REFERENCE TO RELATED APPLICATION

The present application claims priority of German patent application Ser. No. DE102016105716.9 filed Mar. 29, 2016.

BACKGROUND AND FIELD OF THE INVENTION

The present invention relates to a conveyor for conveying suspended objects.

Conveyors of the generic type for conveying suspended objects such as, for example, items of clothing, bags and the like, consist substantially of rail profiles, in which in an upper track a conveyor chain is guided that are coupled to holding adapters guided in a lower track of the rail profiles and entrained by the conveyor chain in a direction of conveyance.

In order to connect differently used conveyor sections together, so-called switches are used. Such switches are used, for example, as sorting switches in order to separate out specific objects from a conveyor section, wherein in these objects are separated out of a rail profile, used as a sorting section, by means of a sorting switch and are forwarded into a buffer section. The previously sorted objects are transferred via an induct switch from this buffer section into a further rail profile adjoining the induct switch.

Although objects accumulated in such a buffer section only travel through these induct switches occasionally, these induct switches are permanently driven in the conveyors known from the prior art—which conveyors are often fitted with a multiplicity of induct switches arranged one behind the other.

SUMMARY OF THE INVENTION

The object of the present invention is to provide a conveyor whereby the induct switches can be operated in a more efficient and cost-effective manner.

In accordance with an embodiment of the present invention, a conveyor for conveying suspended objects has a first rail profile having a first, upper track and a second track arranged below the first track. A conveyor chain having lateral friction roller pressing surfaces, against which friction rollers can be pressed to drive the conveyor chain, can be continuously moved in a direction of conveyance in the first track of the rail profile. A second track is used to guide holding adapters for holding objects to be conveyed, where a head part, mounted so as to be able to roll, of the respective holding adapter is coupled to the conveyor chain in the second track of the rail profile. The conveyor further comprises at least one induct switch, via which the holding adapters can be transferred from a second rail profile into the first rail profile. The induct switch itself comprises a third rail profile having a track, along which the head part of the respective adapter can be guided so as to be able to roll. The induct switch further comprises a drive belt for conveying the holding adapters along the third rail profile and a drive roller driving the drive belt.

A pressing piece which can be adjusted between an active position and a passive position is arranged on a side of the conveyor chain opposite the drive roller. The adjustment path of the pressing piece is dimensioned such that in the active position of the pressing piece the conveyor chain is in contact with the drive roller and in the passive position of the pressing piece the conveyor chain is not in contact with the drive roller, wherein in the active position the drive roller can be driven by the conveyor chain.

Such a conveyor allows the conveyor to be operated in a substantially more efficient and cost-effective manner because the drive belt of the induct switch is then only driven when it is required in the process cycle, that is when objects are to be transferred from the second rail profile into the first rail profile via the induct switch.

According to a particular embodiment in the case of a conveyor having a multiplicity of induct switches arranged one behind the other, the conveyor provides a considerable energy saving because generally only one or only a few induct switch(es) transfer(s) objects into the first rail profile at a predetermined time while the remaining induct switches are at a standstill. In contrast, in conveyors known from the prior art all induct switches are simultaneously and permanently driven, which is associated with a high expenditure of energy and wear.

Sill further, a conveyor in accordance with an embodiment of the present invention may be provided with the drive of the conveyor chain in the first rail profile designed to be weaker because the required force expenditure to drive only one or only a few induct switch(es) is clearly lower than the force expenditure to permanently drive all the induct switches which are arranged on the first rail profile. As a result, depending upon the length of the conveyor section, one drive or a plurality of drives used to drive the conveyor chain of the first rail profile can additionally be spared.

In particular embodiments, a pressing piece, preferably formed as a counter roller, is fixed in a roller seat arranged on the first rail profile. In addition, a rotary spindle of the counter roller may be suspended from a housing of the roller seat in a spring-loaded manner, such that the rotary spindle of the counter roller can be pressed against the friction roller pressing surface—facing away from the drive roller—of the conveyor chain against a spring force. The suspension of the rotary spindle of the counter roller may also be configured such that the rotary spindle of the counter roller is pressed away from the friction roller pressing surface—facing away from the drive roller—of the conveyor chain against a spring force. Alternatively, it is also feasible to displace the rotary spindle of the counter roller between the active position and the passive position mechanically.

All of the adjustment options mentioned above can be applied to the first rail profile in a simple manner.

According to a further embodiment variant, the second rail profile may be formed as a buffer section, having at least one stopping device for blocking and releasing a further conveyance of objects towards the induct switch. The stopping device is coupled to a switching device which activates the adjustment of the counter roller, whereby the counter roller can be adjusted from the passive position into the active position—which brings the conveyor chain into contact with the drive roller—by releasing the stopping device. By coupling the stopping device to the switching device for adjusting the counter roller from the passive position into the active position, the drive of the drive belt of the induct switch is simply coupled to the stopping device so that the induct switch is activated by disconnecting the stopping device for the further conveyance of the objects, which are to be conveyed, from the buffer section into the first rail profile.

BRIEF DESCRIPTION OF THE DRAWINGS

FIG. 4 shows a further side view of the conveyor which is shown in FIG. 2 from a different direction of view.

DESCRIPTION OF THE PREFERRED EMBODIMENTS

In the following description of the figures, terms such as top, bottom, left, right, front, rear, etc. relate exclusively to the example representation and position, selected in the figures, of the direction of conveyance, the rail profiles, the track, the conveyor chain, the induct switch, the stopping device and the like. These terms are not to be understood to be limiting, i.e. these references can change by virtue of different operating positions or the mirrorsymmetrical configuration or the like.

Figure 1:
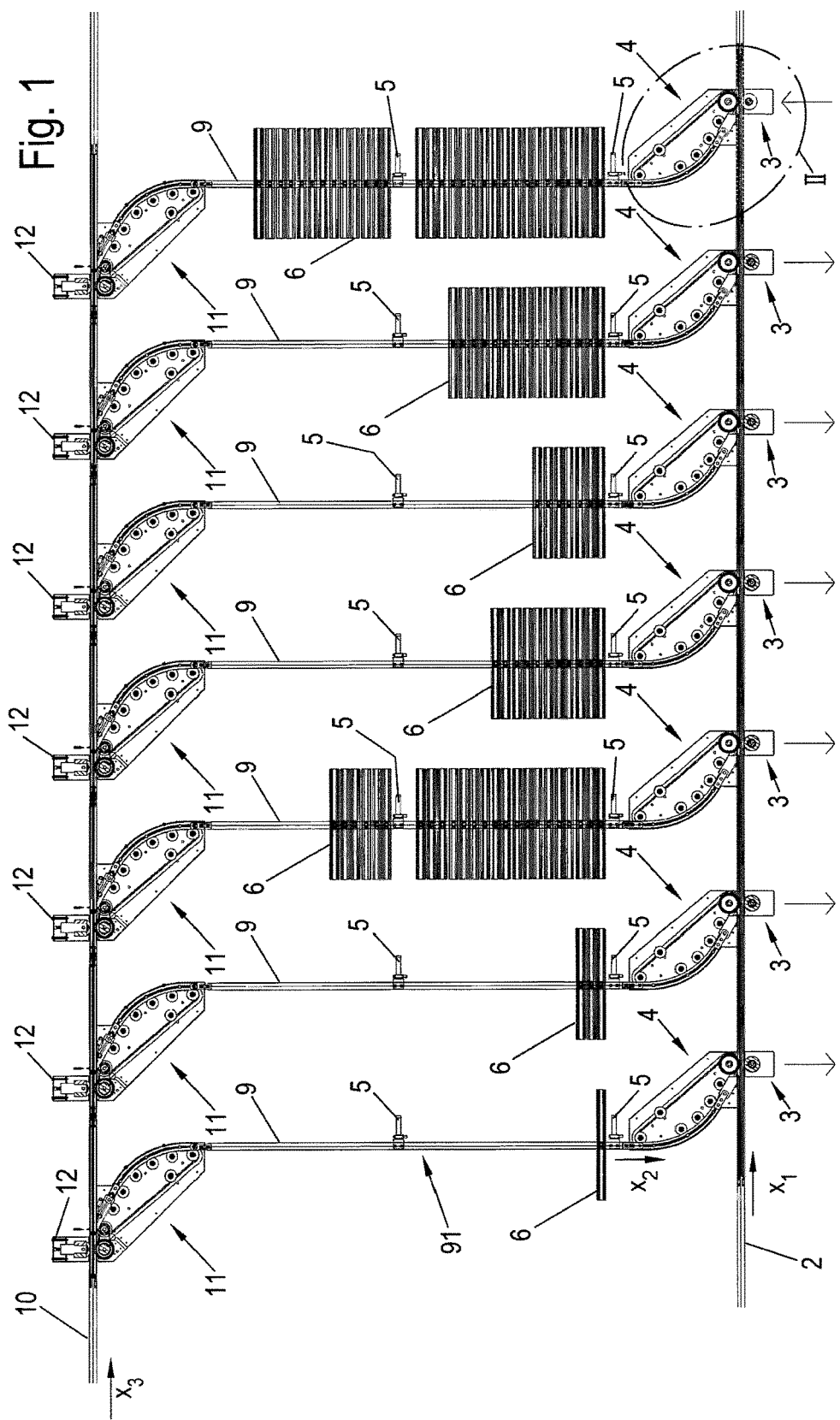
FIG. 1 shows a schematic plan view of one embodiment variant of a conveyor in accordance with the invention comprising a plurality of induct switches connected in series along the first rail profile and a plurality of sorting switches connected upstream of the induct switches and arranged on a further rail profile.

FIG. 1 shows by way of example a detail of a conveyor for conveying suspended objects 6, for example, items of clothing such as coats and suits, or even bags in which shoes, belts or other small items are conveyed. The conveyor comprises a first rail profile 2 having a first, upper track 21, which can be seen in FIG. 3, and a second track 22 arranged below the first track 21. A conveyor chain 7 which can be moved continuously in a direction of conveyance $x_1$ is inserted in the first track 21 of the rail profile 2. The conveyor chain 7 comprises lateral friction roller pressing surfaces 71, 72 against which friction rollers 73 (FIG. 2) can be pressed to drive the conveyor chain 7. The friction rollers 73 used to drive the conveyor chain 7 are fixed on the first rail profile 2 at predetermined distances along the rail profile 2.

The lower, second track 22 is used to mount holding adapters 8 for holding the objects 6 to be conveyed. A head part 81 of the respective holding adapter 8 is mounted so as to be able to roll in the second track 22 of the rail profile 2 and is coupled to the conveyor chain 7 running in the first, upper track 21. The suspended objects 6 to be conveyed, for example, upper clothing such as shirts or jackets, suspended on coat hangers are suspended so as to be conveyed with the coat hanger in a seat of the holding adapter 8 and are conveyed together with the holding adapter 8 along the first rail profile 2.

The running section of the conveyor formed by the first rail profile 2 is formed in this case as a so-called discharge conveyor. Such a discharge conveyor is characterized in that the chain links of the conveyor chain 7 on the one hand are coupled to the holding adapters 8 such that these are carried along by the chain links of the conveyor chain 7, on the other hand in the event of an accumulation of the holding adapters 8 or of the suspended objects 6 to be conveyed the holding adapters 8 are detached from the respective chain link and, for example, slide off over the head parts 81 of the holding adapters 8 so that the conveyor chain 7 continuously moves in the direction of conveyance $x_1$ despite local accumulation of holding adapters 8 or of suspended objects 6 to be conveyed.

In order to pass suspended objects 6 to be conveyed from a second rail profile 9 onto the first rail profile 2, at least one induct switch 4 is provided. In the embodiment variant shown in FIG. 1, a multiplicity of induct switches 4 are arranged one behind the other on the first rail profile 2 along the first rail profile 2. The induct switch 4 comprises, as shown in FIGS. 2-4, a third rail profile 46 having a track 47, along which the head part 81 of the respective adapter 8 can be guided so as to be able to roll.

A drive belt 43 is provided to convey the holding adapters 8 in the transport direction $x_2$ along the third rail profile 46. This drive belt 43 is driven by a drive roller 42.

The drive roller 42 is arranged directly next to the conveyor chain 7 of the first rail profile 2. The drive roller 42 is located on a rotary spindle 45 mounted on a housing 41 of the induct switch 4. As shown in FIG. 3, a transfer roller 48 is mounted on this rotary spindle 45 below the drive roller 42, wherein the drive belt 43 lies on a circle segment area of the peripheral surface of the transfer roller 48. The drive belt 43 is tensioned via further tensioning rollers 44 such that the drive belt 43 can be moved in the direction of conveyance $x_2$ in parallel with the course of the rail profile 46 of the induct switch 4.

Figure 2:
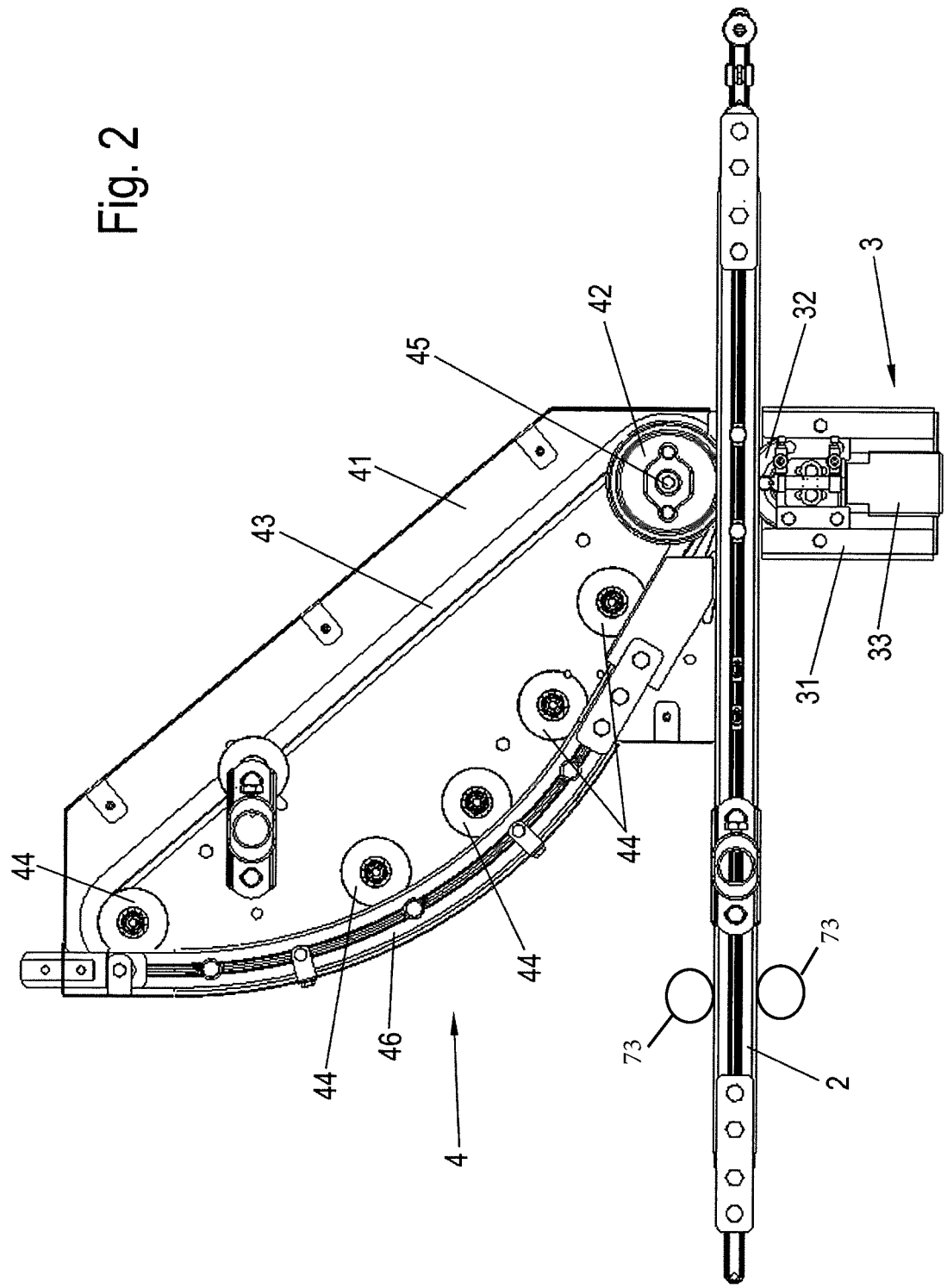
FIG. 2 shows a schematic plan view of a detail, designated by the reference sign II in FIG. 1, of an embodiment variant of a conveyor in accordance with the invention illustrating a first rail profile and an induct switch arranged thereon.
Figure 3:
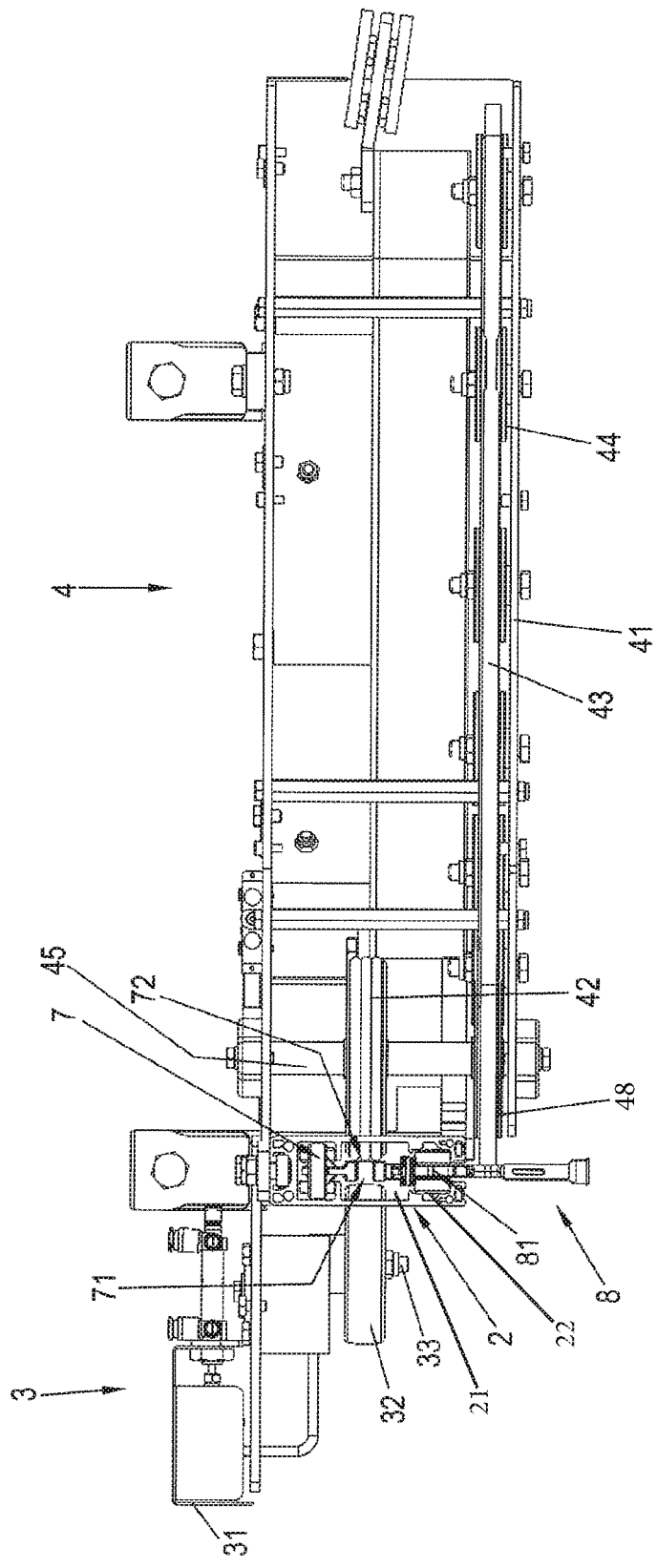
FIG. 3 shows a side view of the detail of the conveyor shown in FIG. 2.

As shown in FIGS. 2 and 3, a pressing piece 32 which can be adjusted between an active position and a passive position is arranged on a side of the conveyor chain 7 opposite the drive roller 42. As shown in the illustrated embodiment, the pressing piece is formed as a counter roller 32 which can be adjusted between the active position and the passive position perpendicular to its rotary spindle. The adjustment path of this pressing piece 32 between the active position and the passive position is dimensioned such that in the active position of the pressing piece 32 the conveyor chain 7 is in contact with the drive roller 42 and in the passive position of the pressing piece 32 the conveyor chain 7 is not in contact with the drive roller 42.

In the active position, the drive roller 42 can be driven accordingly by a conveyor chain 7. It is thereby rendered possible that the drive belt 43 of the induct switch 4 is then only driven when the pressing piece 32 is placed into the active position. The pressing piece 32 slightly presses the conveyor chain 7 perpendicular to the plane of the friction roller pressing surface 71, 72, in particular by one to five millimeters, in the direction of the drive roller 42 of the induct switch 4 so that the drive roller 42 contacts the friction roller pressing surface 72 and thus drives the drive belt 43 of the induct switch 4. In the driven state, the drive belt 42 runs at the same speed as the conveyor chain 7. Alternatively to a counter roller 32, it is also feasible to provide the pressing piece 32 with, for example, a sliding surface which, in the active position of the pressing piece, slides along the friction roller pressing surface 71 of the conveyor chain 7, pressing against same.

In the embodiment variant in which the pressing piece 32 is formed as a counter roller, the counter roller may be fixed in a roller seat 3 arranged on the first rail profile 2. Still further, a rotary spindle 33 of this counter roller 32 may be suspended from a housing 31 of the roller seat 3 in a spring-loaded manner.

In order to adjust the counter roller 32 from the passive position into the active position, the rotary spindle 33 of the counter roller 32 is pressed against the friction roller pressing surface 71, facing away from the drive roller 42, of the conveyor chain 7 against the spring force of a spring part (not shown).

It should be appreciated that it is of course also feasible to provide a kinematically reversed arrangement in which the rotary spindle 33 of the counter roller 32 is urged from the active position into the passive position against the spring force. Likewise it is also feasible for the counter roller 32 to be pulled back from the active position into the passive position or from the passive position into the active position against the spring force.

The adjustment of the pressing piece from the passive position into the active position is actuated via a switching device of the induct switch 4 that is coupled to a stopping device 5 that is used to block and release a further conveyance of objects 6 towards the induct switch 4. As can be seen in FIG. 1, the second rail profile 9 is formed as a buffer section, on which at least one such stopping device 5 is arranged. In the illustration shown by way of example in FIG. 1, two such stopping devices 5 are mounted on each second rail profile 9.

This stopping device 5 is used to accumulate suspended objects 6 to be conveyed which are arriving at the buffer section and, at a predetermined time or after a predetermined number of accumulated objects 6 is reached, to switch from a position in which the objects 6 are accumulated into the position releasing the further conveyance of the objects 6 so that the objects 6 are transferred into the first rail profile 2 via the respective induct switch 4. The situation is thereby achieved that the disconnection of the stopping device 5 simultaneously produces an activation of the induct switch 4, that is a drive of the drive belt 43 of the induct switch 4.

In contrast, the drive belt 43 of the induct switch 4 is at a standstill if the stopping device 5 in front of the respective induct switch 4 is in a position blocking the holding adapters 8 and thus the suspended objects 6, in which position the pressing piece 32 is in its passive position in which the conveyor chain 7 is not in contact with the drive roller 42 of the induct switch 4. The respective stopping devices 5 may be coupled to the respective pressing pieces 32 of these induct switches 4 electrically. However, a mechanical or even hydraulic coupling is also feasible.

In order to carry the holding adapters 8 within the induct switch 4, elevations—which protrude perpendicular to the direction of conveyance $x_2$ and are formed in particular as elastically bendable fingers 49—are formed on an outer surface, facing away from the tensioning rollers 44, of the drive belt 43 of the induct switch 4.

As further shown in FIG. 1, the second rail profile 9 is formed as a buffer section is loaded via a fourth rail profile 10 that is connected to the second rail profile 9 by a sorting switch 11. All the objects 6 to be sorted are thus initially conveyed in the direction of conveyance $x_3$ along the fourth rail profile 10. The respective objects 6 are separated out in one of the second rail profiles 9 at the respective sorting switches 11 arranged one behind the other on the fourth rail profile 10, with the fourth rail profile 10 formed as a so-called sorter.

The sorting switches 11 are configured such that the drive of respective drive belts of these sorting switches 11 is effected via the conveyor chain of the fourth rail profile 10 which is formed in accordance with the first rail profile 2 with two tracks. In this case, the drive is also effected via a respective drive roller which, however, is in permanent contact with the conveyor chain running in the first, upper track of the third rail profile 10, in contrast to the drive roller 42 of the induct switch 4, wherein in this case counter pressure rollers 12 are also used to compensate for the pressing forces of the drive roller on the conveyor chain of the fourth rail profile. The drive roller of the sorting switch 11 is formed as a so-called overdrive, and therefore the drive belt of the sorting switch 11 moves more rapidly than the conveyor chain of the fourth rail profile.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A conveyor for conveying suspended objects, said conveyor comprising:
    a first rail profile having a first, upper track and a second track arranged below the first track;
    a conveyor chain having lateral friction roller pressing surfaces, against which friction rollers are pressed to drive the conveyor chain, wherein the conveyor chain is moved continuously in a direction of conveyance in the first track of the rail profile when the friction rollers are pressed against the friction roller pressing surfaces of the conveyor chain;
    holding adapters for holding objects to be conveyed, each holding adapter having a head part which is mounted so as to be able to roll in the second track of the rail profile and is coupled to the conveyor chain; and
    at least one induct switch, via which the holding adapters are transferred from a second rail profile into the first rail profile, wherein the induct switch comprises a third rail profile having a track, along which the head part of the respective holding adapter is guided so as to be able to roll, a drive belt for conveying the holding adapters along the third rail profile, and a drive roller driving the drive belt;
    wherein a press piece that is adjustable between an active position and a passive position is arranged on a side of the conveyor chain opposite the drive roller, and wherein the adjustment path of the press piece is dimensioned such that in the active position of the press piece the conveyor chain is in contact with the drive roller and in the passive position of the press piece the conveyor chain is not in contact with the drive roller, wherein in the active position the drive roller is driven by the conveyor chain.

2. The conveyor as claimed in claim 1, wherein the press piece comprises a counter roller that is adjusted between an active position and a passive position perpendicular to a rotary spindle.

3. The conveyor as claimed in claim 2, wherein the rotary spindle of the counter roller is suspended from a housing of a roller seat in a spring-loaded manner.

4. The conveyor as claimed in claim 3, wherein the rotary spindle of the counter roller is pressed against the friction roller pressing surfaces of the conveyor chain that face away from the drive roller against a spring force.

5. The conveyor as claimed in claim 4, wherein the second rail profile is formed as a buffer section having at least one stop device for blocking and releasing a further conveyance of objects towards the induct switch, and wherein the stop device is coupled to a switch device that activates the adjustment of the press piece, wherein by releasing the stop device the press piece is adjusted from the passive position into the active position to bring the conveyor chain into contact with the drive roller.

6. The conveyor as claimed in claim 5, wherein the stop device is electrically coupled to the switch device which activates the press piece.

7. The conveyor as claimed in claim 5, wherein the stop device is mechanically or hydraulically coupled to the switch device which activates the press piece.

8. The conveyor as claimed in claim 1, wherein elevations that protrude perpendicular to the direction of conveyance are formed on an outer surface of the drive belt in order to convey the holding adapters further in the direction of conveyance.

9. The conveyor as claimed in claim 8, wherein the elevations comprise elastically bendable fingers.

10. A conveyor for conveying suspended objects, said conveyor comprising:

a first rail profile having a first, upper track and a second track arranged below the first track;

a conveyor chain having lateral friction roller pressing surfaces, against which friction rollers are pressed to drive the conveyor chain, wherein the conveyor chain is moved continuously in a direction of conveyance in the first track of the rail profile when the friction rollers are pressed against the friction roller pressing surfaces;

holding adapters for holding objects to be conveyed, each holding adapter having a head part which is mounted so as to be able to roll in the second track of the rail profile and is coupled to the conveyor chain; and at least one induct switch, via which the holding adapters are transferred from a second rail profile into the first rail profile, wherein the induct switch comprises a third rail profile having a track, along which the head part of the respective holding adapter is guided so as to be able to roll, a drive belt for conveying the holding adapters along the third rail profile, and a drive roller driving the drive belt;

wherein a press piece that is adjustable between an active position and a passive position is arranged on a side of the conveyor chain opposite the drive roller, and wherein the adjustment path of the press piece is dimensioned such that in the active position of the press piece the conveyor chain is in contact with the drive roller and in the passive position of the press piece the conveyor chain is not in contact with the drive roller, wherein in the active position the drive roller is driven by the conveyor chain, and wherein the second rail profile is formed as a buffer section having at least one stop device for blocking and releasing a further conveyance of objects towards the induct switch, and wherein the stop device is coupled to a switch device that activates the adjustment of the press piece, wherein by releasing the stop device the press piece is adjusted from the passive position into the active position to bring the conveyor chain into contact with the drive roller.

11. The conveyor as claimed in claim 10, wherein the press piece comprises a counter roller that is adjusted between an active position and a passive position perpendicular to a rotary spindle.

12. The conveyor as claimed in claim 11, wherein the rotary spindle of the counter roller is suspended from a housing of a roller seat in a spring-loaded manner.

13. The conveyor as claimed in claim 11, wherein elevations that protrude perpendicular to the direction of conveyance are formed on an outer surface of the drive belt in order to convey the holding adapters further in the direction of conveyance.

14. The conveyor as claimed in claim 13, wherein the elevations comprise elastically bendable fingers.

15. The conveyor as claimed in claim 10, wherein the stop device is electrically coupled to the switch device which activates the press piece.

16. The conveyor as claimed in claim 10, wherein the stop device is mechanically or hydraulically coupled to the switch device which activates the press piece.

* * * * *